United States Patent [19]

Pauliukonis

[11] 4,242,571
[45] Dec. 30, 1980

[54] ELECTRO-THERMAL LINEAR PULL ACTUATOR

[76] Inventor: Richard S. Pauliukonis, 6660 Greenbriar Dr., Cleveland, Ohio 44130

[21] Appl. No.: 7,048

[22] Filed: Jan. 29, 1979

[51] Int. Cl.³ .............................................. H05B 3/80
[52] U.S. Cl. ................. 219/513; 200/83 R; 337/117
[58] Field of Search ............... 219/253, 437, 511, 512, 219/513; 200/81 R, 83 J, 83 Y, 83 R, 83 S; 236/68 R; 73/368; 337/117, 114, 120, 315, 320; 60/530, 531

[56] References Cited

U.S. PATENT DOCUMENTS

| | | | |
|---|---|---|---|
| 2,985,732 | 5/1961 | Russell | 200/83 J |
| 3,046,964 | 7/1962 | Chery | 200/83 Y |
| 3,585,337 | 6/1971 | Farmery | 200/83 Y |
| 3,967,781 | 7/1976 | Kunz | 219/511 X |
| 4,029,941 | 6/1977 | Huebscher | 219/511 |
| 4,081,636 | 3/1978 | Rice | 200/83 Y |
| 4,104,507 | 8/1978 | Tisone et al. | 219/513 |

FOREIGN PATENT DOCUMENTS 687531  3/1965  Italy ....................... 200/83 J

*Primary Examiner*—Harold Broome
*Attorney, Agent, or Firm*—Richard S. Pauliukonis

[57] ABSTRACT

A linear pull actuator converts working fluid such as halogenated hydrocarbons into vapor by electrical heating element housed inside a shell, generating a vapor pressure against a rolling membrane secured inside actuator so as to respond to the vapor pressure linearly delivering an end force to an integral first piston and tube assembly which is adaptable to axially move inside the housing proper against spring biasing means along with an externally mounted second piston of a piston and rod assembly secured thereto by a spring so as to have rod end passing centrally through the tube protrude a distance out of the shell end for a position change from a first rod end protruded when electrical heater is not energized electrically to a second rod end retracted position with work when pulled away by the pistons due to the vapor pressure of the working fluid when the electrical heater is energized electrically, de-energization of the electrical heating element electrically returns the rod end to the first protruded position due to the spring biasing force action over pistons automatically when vapor pressure dissipates. The shell is divided into an annular sealed heater compartment with working fluid housed therein and closed by two disk-like membranes secured permanently to the central tube of the piston and tube assembly, and an atmospheric compartment housing spring biasing means and also second piston and rod assembly with second piston abutting the first piston on one side while on another-it is backed up by a spring secured inside a shell cap so as to have rod enter centrally the tube to protrude therethrough to the opposite shell end, including adjustment of spring tension the rod end experiences when in the first position, and also shell mounting threads to a work piece, to facilitate an easy adaption of actuator to various applications be it a valve housing, a pump housing or other industrial/consumer device requiring pull type actuator with capability of an easy access for maintenance and replacement of parts.

9 Claims, 1 Drawing Figure

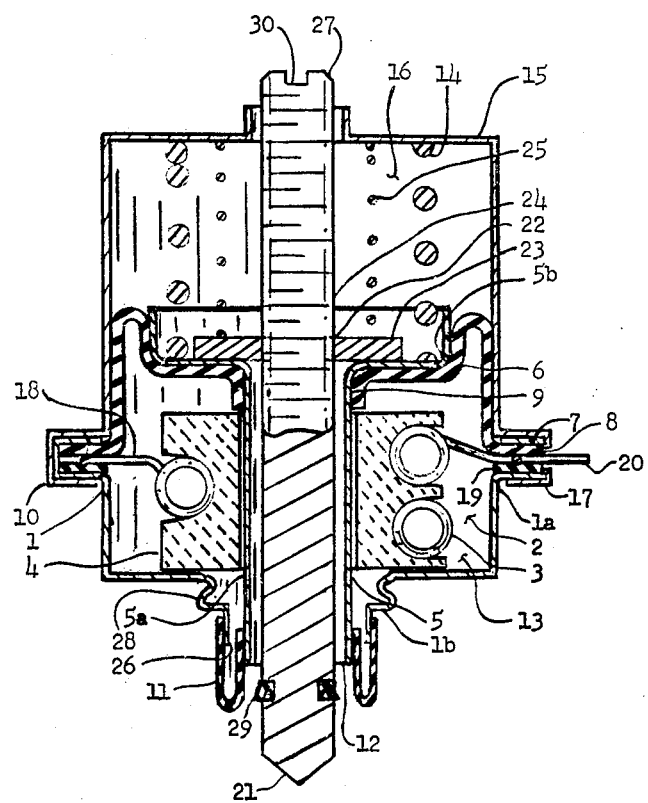

ELECTRO-THERMAL LINEAR PULL ACTUATOR

This invention relates to linear actuators energized by electro-thermal means and more particularly to a pull type linear actuator trigerred by electrical heating element to produce an end thrust by thermal vaporization of a self-contained working fluid generating pressure against pistons normally used in such devices along with rolling membranes.

There is no pull type electro-thermal actuator of any value on the market, although there are many push type designs serving various applications industrially well. This may be explained by the fact that actuator manufacturers cover a more common requirement in the field by push type actuators and ignore pull type applications due to often added complexity to a pull type operator design and manufacture. The lack of adequate electro-thermal pull type actuator is accentuated by the fact that the most simple applications requiring pull type force actuation are presently serviced by electrical solenoids with plungers operated by magnetic force. However, both the plunger material and the solenoid coils are quite costly, and as such, solenoid pull type operators often lead to an excessive price of the end product. For example, a simple valve, operated by a solenoid actuator may include up to 90% cost for solenoid operator alone. In contrast, thermo-electric or electro-thermal actuators when mass produced like solenoids are available for a fraction of solenoid operator price.

Therefore, a principal object of the present invention is to provide an improved electro-thermal actuator. Another object of the invention is to provide an electro-thermal actuator that exploits push type technology in pull type applications. Further object of the invention is to provide a pull type actuator which sinplifies fabricating operations by utilizing elastomers with heat shrinking characteristics for sealing membranes.

Another object of the invention is to provide a pull type actuator with improved capability for assembly to a work piece and an easy access for maintenance. Further, an additional object of the invention is to provide a simple electro-thermal actuator having adjustment means for pull-rod tension in service. In one aspect, this provision would allow actuator use with many valves of simplified design if such adjustment could easily be incorporated into the valving system. Another object of the invention is to provide an electro-thermal actuator for universal use with valves, pumps and other devices, some requiring pilot port seals, some necessitating pilot exhaust, others—plain atmospheric exhaust, all of which could easily be incorporated into the actuator design of the present invention. Devices of this type which improve ultimate performance of a system at reduced cost are obviously desirable because they are simple, relatively inexpensive and reliable means of providing pull-type linear actuation for many applications.

These and other objects and advantages of the invention will become more fully apparent from the following description of the embodiment of the invention taken together with the accompanying drawing.

In the drawing is a cross-section of a pull type electro-thermal actuator in a vertical position.

Shown in the drawing is an actuator 10 having a housing shell 1 of which a large end 1a is adaptable to receive through an open mouth 2 an electrical heating element 3 mounted peripherally over an insulator 4 so as to centralize the heater 3 inside shell 1 over a tube 5 of a first piston and tube assembly 5a inserted through a central opening 9 of a disk-like first rolling elastomer membrane 6 which is secure inside a flange 7 of the shell 1 by a rim 8 and also inside opening 9 by sealing membrane 6 to the tube 5 by the use of glue or elastomer heat shrinking techniques or both. A small shell end 1b is shown to include a protruding outwardly threaded extension 28 which terminates with a lip 26 adaptable to be connected by a second rolling elastomer membrane 11 to the very end 12 of the tube 5 thereby securing shell proper 13, housing the working fluid along with the electrical heating element 3 completely sealed from outside to enable actuator operation when the heating element 3 becomes electrically energized generating a vapor pressure against the large rolling membrane 6 delivering an end force to the integrally mounted first piston 5b of the first piston and tube assembly 5a while the small second membrane 11 experiencing less end force allows unrestricted axial movement of the tube 5 along with piston 5b upwardly against a spring 14 lodged inside a shell cap 15 shown to have a large recessed cavity 16 for housing other components of the actuator while being permanently secured at the flange 17 over the flange 7 of the shell 1. The second membrane 11 may simply be either glued or otherwise secured by heat shrinking to the lip 26 as well as tube end 12 in a similar fashion membrane 6 is fixed to the tube 5. Rim 8 of membrane 6 comprising a flange gasket is pinched between the flanges 7 and 17 and secured inside flange 7 of the shell 1 and cap 15 respectively after placing a terminal wire 18 of the electrical heater 3 backed up by a gasket ring 19 therebetween to insure seal type construction while simultaneously providing appropriate electrical insulation for the leads of electrical heater 3 and for external electrical terminals 20 shown to extend outwardly by penetrating through the flanges 7 and 17 for connecting to an electrical plug (not shown). Obviously, the electrical connections may be provided in different fashion to suit, but it is felt that the flange construction described offers a lot stronger terminal connection if initiated inside the firmly secured wire inside the flange, without upsetting the integrity of the flange seal, and in turn-of the shell. Disconnecting electrical current from the heating element 3 automatically eliminates the end thrust to the piston 5b due to dissipation of the vapor pressure which is subject to heat, and when heater is turned off, there is no energy left inside the shell 1 forcing the return of the first piston assembly 5a to a first normally downward position by the spring force spring 14 is constantly exerting over the first piston 5b.

Referring back to the drawing we can see a rod end 21 of a separate pull rod 27 of a second piston and rod assembly 22 protruding downward out of inside of tube 5 beyond the shell end 1b while a second piston 23 of the assembly 22, centrally receiving a threaded rod portion at 24, is secured inside the shell cap 15 by another spring 25 so as to abut the first piston 5b on its side in order to be moved axially together with the first piston 5b when the shell proper 13 becomes pressurized in accordance with the preceding description. In turn, the rod end 21 will move from a first normally protruding the tube end 12 position shown in the drawing when electrical heating element is not energized to a second position (not shown) with rod end 21 fully retracted when the heating element 3 becomes electrically energized triggerring vaporization of the working fluid with instanteneous pressure rise inside the shell proper 13 forcing the membrane 6 along with pistons 5b and 23 upward with a force large enough to perform a pull function by the pull rod 27, and vice versa.

To note is the fact that this actuator contains many innovations not found in all other electro-thermal actuators. First, and significant provision is found in the threaded extension 28 which permits an easy mounting of the actuator 10 to a work piece be it a valve housing or a plate. In mass production, threads of threaded extension 28 can be rolled into the end of the housing shell 1 without great manufacturing cost. Second, the adjustment of the pull rod 27, threaded as desired to suit, will eliminate many headaches in assembly due to the ability to adapt rod end 21 protrusion to any dimension regardless of the type of work piece involved. In one application, this actuator was used with an internally piloted valve having the rod end 21 close and maitain shot a pilot port of an axially extending valve stem while the actuator was fastened to the valve housing by way of threaded extension 28, dictated the use of a rod seal 29 for a cavity, usually atmospheric, except when actuator was electrically energized, at which time the pull rod 27 uncovers the pilot port for pilot fluid to pressurize said cavity by lifting rod end 21 from the pilot port of the stem so that the seal 29 enters the tube end 12 rendering such cavity sealed, satisfying the needs for actuator 10 to be not only easily adaptable to the work piece but also easily convertable to serve many applications with minimum changes and associated cost. Having slot 30 in the top of the pull rod 27 enabled tension adjustment over described pilot port of the valve cited regardless of dimensional changes in the position of the stem top relative to the rod end 21 both of which varied due to accumulation of manufacturing tolerances so that through tension adjustment a point was reached resulting in lifting piston 23 from piston 5b until shell proper 13 was pressurized after the heating element 3 was energized electrically, closing the gap therebetween to result in piston rod retraction in service in accordance with the preceding description.

From above it is obvious that actuator 10 entails two separate compartments of which one is sealed comprising a shell proper 13 housing the working fluid and the heating element 3 and protected from outside by membranes 6 and 11 secured to the tube 5 as well as both ends of shell 1, and another atmospheric compartment, external to membranes and the tube 5 having a piston and rod assembly 22 and the springs 14 and 25 contained substantially inside the shell cap 15, comprising a simple actuator without equal on the market, in accordance with the objectives set forth for this invention. This invention is not restricted to the slavish imitation of each and every one of the details described above, which have been set forth merely be way of example, with the intent of most fully setting forth the teachings of the invention. Obviously, changes can be made to the above without departing from the invention.

What is claimed is:

1. An electro-thermal pull type actuator comprising:
   a housing shell including a first flange and also a first open mouth end closed and secured by a first large size rolling membrane centrally receiving an integrally secured axially movable piston and tube assembly of which a first piston is abutting said membrane externally thereto while said tube extending inwardly enters said shell internally to proceed centrally therethrough toward a second shell end wherein it is secured permanently to said shell by a second small size rolling membrane thereby insuring sealed shell proper inside of which an electrical heating element is disposed centrally over said tube with electrical leads to the outside sealed and also a working fluid housed therein subject to vaporization by said heating element for the development of a end thrust against said large membrane with said first piston attached thereto to result in said axial movement of said piston and tube assembly, when said heating element is electrically energized, the direction of movement being upward due to large membrane surface, a biasing force means external to said large size membrane to counter said end thrust and to maintain said piston in a first normally down position, when said heating element is not energized electrically,
   a shell cap with a recessed cavity over said biasing force means and a second flange thereof covering said first flange of said shell so as to secure said first membrane by the edges sealed, means for sealing said first membrane to said centrally passing tube of said piston and tube assembly, including sealing said second membrane, a pull rod assembly including a second piston thereof inside said cavity of said cap abutting said first piston and maintained therein by a spring of said biasing force means while said rod passing inside said tube of said piston and tube assembly protrudes said second shell end, normally exerting a down force when said actuator is secured to a work piece until an opposing force of said end thrust inside said shell moves said piston from a first normally down position to a second upward position thereby urging both pistons to move from a first to a second positions against said biasing force means with subsequent withdrawal of said protruding rod end comprising a pull type actuator means for remote actuation of various mechanisms.

2. An actuator as in claim 1 wherein said second shell end is threaded for securing it to a work piece such as a valve housing where it serves as a valve operator.

3. An actuator as in claim 1 wherein said rod of said piston and rod assembly is threaded and secured inside said second piston center hole which is also threaded so as to permit length adjustment of said protruding rod end passing said second shell end.

4. An actuator as in claim 1 wherein said biasing force means housed in said recessed cavity of said shell cap include a first spring for holding down said first piston against said first membrane and a second spring for holding down said second piston against said first piston.

5. An actuator as in claim 3 wherein said shell cap is provided with a central hole for passage of said second rod end therethrough and external adjustment of said protruding rod end passing said second shell end, while said recessed cavity is atmospheric.

6. An actuator as in claim 1 wherein said electrical leads of said electrical heating element consist of round wire housed in said flange between said first membrane edge and an insulation strip, said wire conforming to the contour of said flanges to provide strong physical base for attachement of electrical terminal thereto.

7. An actuator as in claim 1 wherein said shell, said first and second flanges and said shell cap are round, including disk-like first and and second membranes.

8. An actuator as in claim 2 wherein said protruding piston rod end is tapered and adaptable to serve as closure means for piloted fluid passages of a valve stem, for example.

9. An actuator as in claim 2 wherein said protruding rod end adjacent said second shell end which is threaded is provided with a peripheral groove and a seal, and when said pistons are in said first normally down position, said seal is disengaged allowing atmospheric air to pass between said rod and said tube while when said pistons are in said second upward position, said seal engages said tube to seal said air passage between said tube and said protruding rod end.

* * * * *